J. FRASER.
COMBINED MIXING AND DELIVERY VALVE SYSTEM.
APPLICATION FILED JUNE 12, 1920.
1,354,291.    Patented Sept. 28, 1920.
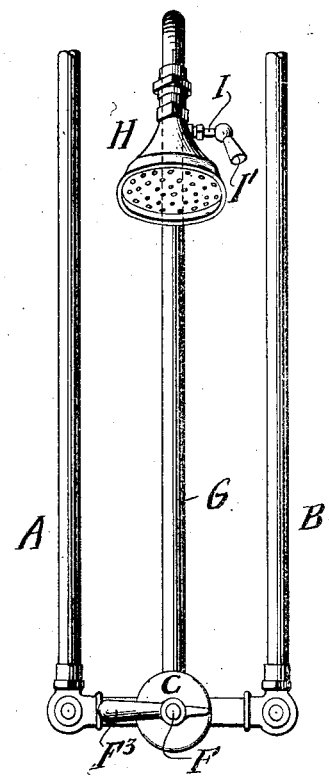
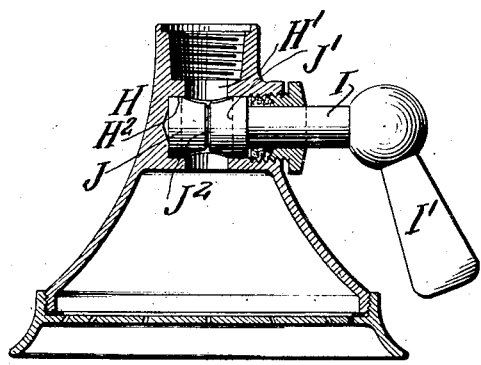
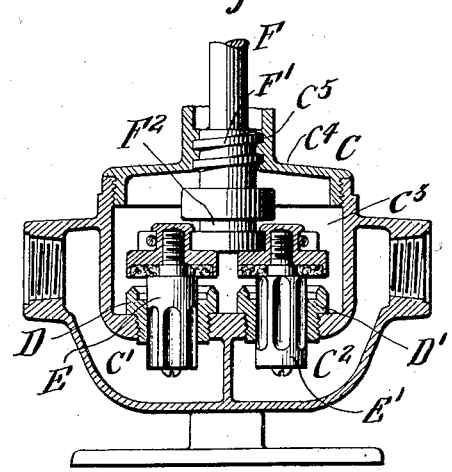
WITNESS.
Gustav Genzlinger.
INVENTOR.
James Fraser
BY
Francis Chandler
ATTORNEY

UNITED STATES PATENT OFFICE.

JAMES FRASER, OF WILMINGTON, DELAWARE, ASSIGNOR TO SPEAKMAN COMPANY, OF WILMINGTON, DELAWARE, A CORPORATION OF DELAWARE.

COMBINED MIXING AND DELIVERY VALVE SYSTEM.

1,354,291.  Specification of Letters Patent.  Patented Sept. 28, 1920.

Application filed June 12, 1920. Serial No. 388,422.

*To all whom it may concern:*

Be it known that I, JAMES FRASER, a resident of Wilmington, county of New Castle, State of Delaware, a citizen of the United States of America, have invented certain new and useful Improvements in Combined Mixing and Delivery Valve Systems, of which the following is a true and exact description, reference being had to the accompanying drawings, which form a part thereof.

My invention relates to a combined mixing and delivery valve system especially designed for use in connection with showers having hot and cold water supply, though adapted obviously for other uses. As heretofore constructed it has been usual to provide in the delivery pipe, leading from the mixing valve, a stop cock for regulating or shutting off the flow from the delivery pipe and where the pressures in the pipes leading into the mixing valve are equal, the closing of the stop cock brought about a condition in which the high pressure fluid would flow through the mixing valve into the low pressure conduit. To prevent this, check valves have been used in high and low pressure conduits but the use of such valves not only adds to the expense but has been found unsatisfactory and frequently ineffective. The object of my invention is to provide a valve system of simple and effective construction which will counteract the tendency to back flow and will at the same time provide an indicator showing whether or not the mixing valve has been closed.

The nature of my invention will be best understood as described in connection with the drawings in which—

Figure 1 is an elevation of a shower installation equipped with my improvement.

Fig. 2 is a sectional elevation of the shower head and of the plug cock controlling flow through the delivery pipe and head, and Fig. 3 is a sectional elevation of a mixing valve adapted for use in my system.

A and B indicate hot and cold water supply pipes adapted for use in my combination but not forming an essential feature thereof in this mixing valve. $C'$ and $C^2$ are respectively the hot and cold water chambers; $C^3$ the mixing chamber; $C^4$ the removable cover or head of the mixing chamber formed as shown, with a threaded portion, $C^5$. D and $D'$ are the valve seats screwing into the openings between the chambers $C'$ and $C^2$ and the chamber $C^3$ and formed, as shown, with cylindrical portions in which work the cylindrical grooved portions E and $E'$ of the valves which are moved up and down through their engagement with the grooved portion $F^2$ of the valve stem F, having a threaded portion $F'$ screwing into the threaded opening $C^6$ of the lid C. $F^3$ indicates the handle secured to the valve stem F. G is the delivery pipe leading from the mixing chamber $C^3$ of the valve C and to the end of which, as shown, is secured the shower head H formed in the part $H'$ and a plug valve seat $H^2$ in which works the plug cock J formed with the usual port indicated in dotted lines at $J'$ and adapted to register with the port $H'$ and formed also with a peripheral groove or supplemental port indicated at $J^2$ which remains open in all positions of the plug cock and affords a constant, though restricted, passage for the flow of liquid from the delivery pipe into the shower head. I is a valve stem working through a stuffing box and secured to the plug cock J and $I'$ a handle for operating the valve.

In operation the valves E and $E'$ are raised from their seats to such a degree as to secure the desired mixture of hot and cold water in the mixing chambers C and $C^3$ of the valve and the mixed liquids flow through the delivery pipe G and through the plug cock J into the shower. By turning the plug cock the flow through the shower is regulated or when desired is practically cut off but when the plug cock is in position to cut off the flow the mixed liquids can still flow to a limited extent through the groove $J^2$ and this restricted minimum flow is found in practice to quite effectually counteract the tendency to back-flow in the low pressure supply pipe, thus enabling check valves in the supply pipes to be dispensed with. Another advantage of the restricted minimum flow through the plug cock is that it affords an indication as to the position of the mixing valve plugs and this affords a greater assurance of the mixing valve being closed when the shower is out of use.

Having now described my invention, what I claim as new and desire to secure by Letters Patent, is:

1. In combination with pipes for conducting liquids to a mixing valve, a mixing valve, a delivery pipe leading from said valve and a valve for controlling flow through said delivery pipe formed with a supplemental port of restricted area which remains open when the valve is closed.

2. In combination with pipes for conducting hot and cold water to a mixing valve, a mixing valve, a delivery pipe leading from said valve and a plug cock for controlling flow through said delivery pipe formed with a supplemental port of restricted area which remains open when the cock is closed.

3. In combination with pipes for conducting hot and cold water to a mixing valve, a mixing valve, a delivery pipe leading from said valve, a shower head secured to said delivery pipe and a plug cock in said head formed with a supplemental port of restricted area which remains open when the cock is closed.

JAMES FRASER.